UNITED STATES PATENT OFFICE.

HARRY S. MORK, OF BROOKLINE, MASSACHUSETTS, ASSIGNOR, BY MESNE ASSIGNMENTS, TO AMERICAN LA FRANCE FIRE ENGINE COMPANY, INC., OF ELMIRA, NEW YORK, A CORPORATION OF NEW YORK.

FIRE-EXTINGUISHER COMPOSITION.

1,393,237.  Specification of Letters Patent.  Patented Oct. 11, 1921.

No Drawing.  Application filed January 14, 1918.  Serial No. 211,836.

*To all whom it may concern:*

Be it known that I, HARRY S. MORK, a citizen of the United States, residing at Brookline, county of Norfolk, State of Massachusetts, have invented a certain new and useful Fire-Extinguisher Composition, of which the following is a specification.

My invention relates to fire extinguisher charges and more particularly to the carbonate solution from which carbon dioxid for expelling the extinguishing medium is generated by reaction with a suitable acid. Alkali metal salts of carbonic acid, either in the form of bicarbonate or in the form of the normal carbonate have been commonly employed for such solutions, while sulfuric acid or hydrochloric acid has usually been employed as the acid charge. In order that the carbonate solution may always remain in a condition suitable for use even when exposed to low temperatures, it has been proposed to incorporate in the carbonate solution, an ingredient for lowering the freezing point thereof. Most of those ingredients which have been heretofore proposed for this purpose are subject to one disadvantage or another. In some instances, the addition agent tends to give rise to the formation of a precipitate of insoluble carbonate or other salt or to retard the generation or evolution of the carbon dioxid gas; or its effect in small quantities has not been sufficiently marked in depressing the freezing point.

The object of my invention is to produce a carbonate solution charge of the desired low freezing point which shall be free from the disadvantages above noted. At the same time, the invention seeks to avoid the use of ingredients which might involve undue expense, or which would in any way interfere with the fire extinguishing qualities of the medium which is to be ejected from the apparatus.

According to the present invention, the carbonate solution embodying the ingredients for depressing the freezing point, exhibit all the good qualities required in a medium of this kind and in addition to having the desired low freezing point, the solution also has a somewhat increased capacity for generating carbon dioxid due to the presence of the ingredient for lowering the freezing point.

The carbonate solution embraced by my present invention comprises as essential ingredients, ammonium bicarbonate, and an alkali metal acetate, especially sodium acetate.

In order that those skilled in this art may be able to practise the invention I shall describe one or two specific embodiments thereof, it being understood that the proportions or details thereof may be varied without departing from the principle disclosed and claimed herein.

A solution of 5.21 grams of ammonium bicarbonate with 53.6 grams sodium acetate crystals and 100 c. c. of water shows a freezing point of somewhere in the neighborhood of $-59°$ F., whereas a solution of 5.21 grams of ammonium bicarbonate and 53.8 grams potassium acetate crystals in 100 c. c. of water has a freezing point of about $-57°$ F. The presence of the acetate does not interfere with the setting free of carbon dioxid when the carbonate is acted upon by an oxid, but on the contrary is somewhat beneficial in this respect. The proportions above given may, of course, be varied to suit particular requirements, but the statement above given will be sufficient to enable one skilled in the art to understand and practise the invention.

Any of the solutions embodied in my invention are well adapted to perform the functions required of a fire-extinguishing medium. They are in practice employed, for example, as a charge in any approved type of fire extinguisher, in which an acid charge is maintained and may be introduced into the carbonate solution for developing the pressure gas of carbon dioxid employed for expelling the medium upon the fire.

I claim:

A carbonate solution for fire extinguishers, comprising as essential ingredients ammonium bicarbonate and sodium acetate in substantially the proportions of 5.21 grams ammonium bicarbonate and 53.6 grams sodium acetate in 100 c. c. of water.

HARRY S. MORK.